(12) United States Patent
Bowman et al.

(10) Patent No.: US 9,972,978 B2
(45) Date of Patent: May 15, 2018

(54) SPARK PLUG GASKET AND METHOD OF ATTACHING THE SAME

(71) Applicant: Federal-Mogul Ignition Company, Southfield, MI (US)

(72) Inventors: Jeremy M. Bowman, Livonia, MI (US); Kevin J. Kowalski, Perrysburg, OH (US)

(73) Assignee: FEDERAL-MOGUL IGNITION COMPANY, Southfield, MI (US)

( * ) Notice: Subject to any disclaimer, the term of this patent is extended or adjusted under 35 U.S.C. 154(b) by 11 days.

(21) Appl. No.: 15/180,606

(22) Filed: Jun. 13, 2016

(65) Prior Publication Data

US 2016/0365706 A1 Dec. 15, 2016

Related U.S. Application Data

(60) Provisional application No. 62/175,744, filed on Jun. 15, 2015.

(51) Int. Cl.
| | |
|---|---|
| *H01T 13/00* | (2006.01) |
| *H01T 13/08* | (2006.01) |
| *H01T 21/00* | (2006.01) |
| *F02P 13/00* | (2006.01) |

(52) U.S. Cl.
CPC ............ *H01T 13/08* (2013.01); *H01T 21/00* (2013.01); *F02P 13/00* (2013.01)

(58) Field of Classification Search
CPC .......... H01T 21/00; H01T 21/02; H01T 13/08
USPC ........................................................ 313/141
See application file for complete search history.

(56) References Cited

U.S. PATENT DOCUMENTS

| | | | | |
|---|---|---|---|---|
| 2,308,968 | A | | 1/1943 | Gregory |
| 3,156,477 | A | * | 11/1964 | Hopp .................... H01T 13/08 277/598 |
| 3,609,837 | A | | 10/1971 | Bretsch |
| 4,064,612 | A | * | 12/1977 | Hopp .................. B25B 27/0028 277/637 |
| 4,810,454 | A | | 3/1989 | Belter |
| 5,184,529 | A | * | 2/1993 | Matsubara ............. B25B 13/06 81/124.5 |
| 6,655,334 | B2 | | 12/2003 | Inagaki |
| 7,477,006 | B2 | | 1/2009 | Fukuzawa |

(Continued)

FOREIGN PATENT DOCUMENTS

| | | | | |
|---|---|---|---|---|
| GB | 912434 | A | * 12/1962 | ............ H01T 13/08 |
| GB | 914915 | | 1/1963 | |

*Primary Examiner* — Christopher Raabe
(74) *Attorney, Agent, or Firm* — Reising Ethington, P.C.

(57) ABSTRACT

A spark plug and a method of manufacturing the same, where the spark plug has a metal shell, an insulator, a center electrode, a ground electrode, and a gasket located over a threaded portion of the shell and used to seal the spark plug against a cylinder head. Once the gasket is attached on the spark plug, it is shrunk to become a post-formed gasket with an inner diameter that prevents the post-formed gasket from slipping over a threaded portion of the metallic shell. This process may be carried out with a collet type machine that produces a post-formed gasket that is flat and has a substantially uniform thickness, which can improve the sealability of the gasket. This may be important when the spark plug is installed in a cylinder head made from a lost foam casting process or other process that creates a somewhat porous sealing surface.

12 Claims, 3 Drawing Sheets

(56) References Cited

U.S. PATENT DOCUMENTS

| | | |
|---|---|---|
| 7,825,572 B2 | 11/2010 | Nakayama |
| 7,847,473 B2 | 12/2010 | Suzuki |
| 7,923,910 B2 | 4/2011 | Nakamura |
| 7,977,856 B2 | 7/2011 | Hartmann |
| 8,035,286 B2 | 10/2011 | Below |
| 8,206,194 B2 | 6/2012 | Mori |
| 8,643,263 B2 | 2/2014 | Burrows |
| 8,704,434 B2 | 4/2014 | Moritani |
| 8,723,405 B2 | 5/2014 | Kato |
| 8,878,426 B2 | 11/2014 | Sakakura |
| 2008/0098974 A1 | 5/2008 | Fukuzawa |
| 2008/0203882 A1* | 8/2008 | Kobayashi ............. H01T 21/02 313/141 |
| 2012/0252298 A1 | 10/2012 | Hori |
| 2014/0070691 A1 | 3/2014 | Kyuno |
| 2014/0070692 A1 | 3/2014 | Kyuno |
| 2015/0194792 A1 | 7/2015 | Shimamura |

* cited by examiner

SPARK PLUG GASKET AND METHOD OF ATTACHING THE SAME

REFERENCE TO RELATED APPLICATIONS

This application claims the benefit of U.S. Provisional Application No. 62/175,744 filed Jun. 15, 2015, the contents of which are hereby incorporated by reference in their entirety.

FIELD

This disclosure generally relates to spark plug gaskets and methods of attaching the same and, more particularly, to such gaskets and methods where a substantially planarity of the gasket is maintained throughout the attachment process.

BACKGROUND

Spark plugs are used to initiate combustion in internal combustion engines. Spark plugs typically ignite a gas, such as an air/fuel mixture, in a combustion chamber by producing a spark across a spark gap defined between two or more spark plug electrodes. Ignition of the gas by the spark causes a combustion reaction that, in turn, drives a piston within an engine cylinder during a power stroke of the combustion process.

It is desirable to reduce exhaust gas leakage during the combustion process, such as that caused when exhaust gas leaks past the threaded metal shell of the spark plug and out a cylinder head of the engine. In order to reduce or stop such leakage, most spark plugs include a washer-like gasket that becomes compressed between a shoulder of the threaded metal shell and the cylinder head when the spark plug is threadingly installed in the engine. The compressed gasket then creates an air-tight seal between the spark plug and a cylinder head sealing surface.

The effectiveness of the air-tight seal can be impacted by the material or composition of the cylinder head sealing surface against which the spark plug gasket seals. In an effort to reduce vehicle weight, some vehicle manufactures are now utilizing new manufacturing processes, such as lost foam casting, to produce cylinder heads out of certain aluminum and other light weight alloys. Although effective at reducing weight, cylinder heads produced according to such processes are known to have somewhat porous surfaces that are difficult to seal against. This challenge can be further exacerbated when the spark plug gasket is crimped or otherwise deformed during an assembly process so that it no longer has a flat and planar surface to contact and seal against the porous sealing surface of the cylinder head.

It is, therefore, desirable to provide a spark plug gasket that can overcome the porosity and/or other drawbacks of such cylinder head sealing surfaces and create a satisfactorily air-tight seal between the spark plug and the cylinder head.

SUMMARY

According to one aspect, there is provided a spark plug, comprising: a metallic shell having an axial bore and a threaded portion; an insulator having an axial bore and being disposed at least partially within the axial bore of the metallic shell; a center electrode being disposed at least partially within the axial bore of the insulator; a ground electrode being attached to the metallic shell, and a post-formed gasket having a first gasket sealing surface, a second gasket sealing surface, and an inner diameter ($D_f$) that prevents the post-formed gasket from slipping over the threaded portion of the metallic shell, wherein the post-formed gasket is flat and has a substantially uniform thickness (T).

According to another aspect, there is provided a method of attaching a gasket to a metallic shell of a spark plug, the method comprising the steps of: inserting a pre-formed gasket overtop of a threaded portion of the metallic shell, wherein the pre-formed gasket has a pre-formed inner diameter that is greater than an outer diameter of the threaded portion; inserting the metallic shell with the pre-formed gasket thereon into an attachment tool; driving the attachment tool from an open position to a closed position such that the attachment tool exerts a radially inward force against the pre-formed gasket; and transforming the pre-formed gasket into a post-formed gasket that has a post-formed inner diameter that is less than the outer diameter of the threaded portion, wherein the post-formed gasket is flat and has a substantially uniform thickness.

DRAWINGS

Preferred exemplary embodiments will hereinafter be described in conjunction with the appended drawings, wherein like designations denote like elements, and wherein:

FIG. 3B shows a round collet and gasket and FIG. 3C shows a hex collet and gasket;

Figures 1, 2:
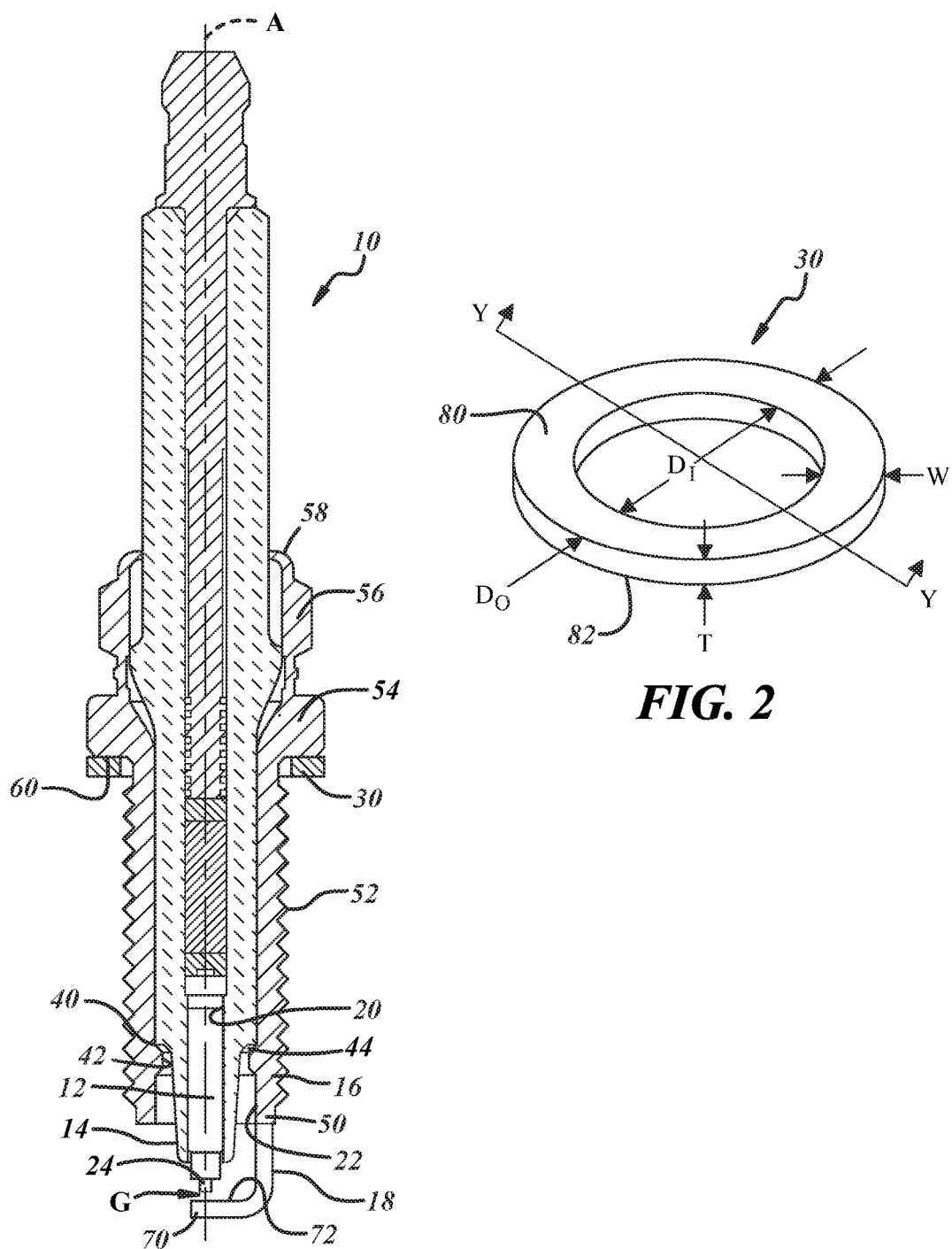
FIG. 1 is a cross-sectional view of a spark plug with an exemplary spark plug gasket.
FIG. 2 is a perspective view of a spark plug gasket, such as the gasket of FIG. 1.
Figure 4B:
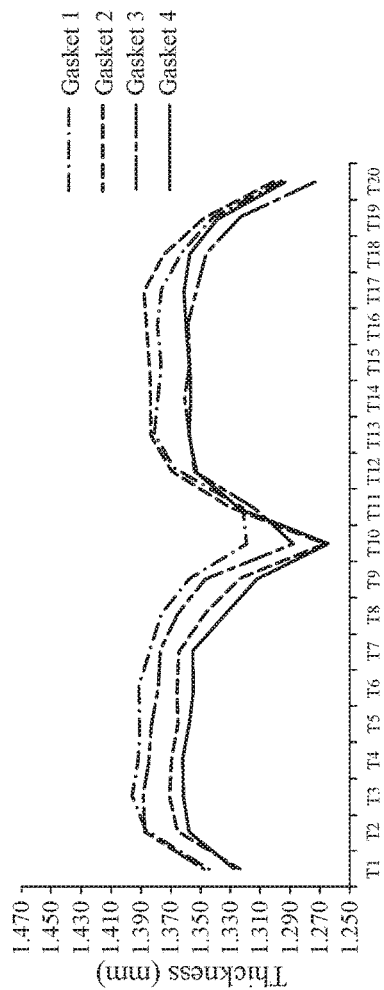
Figure 4C:
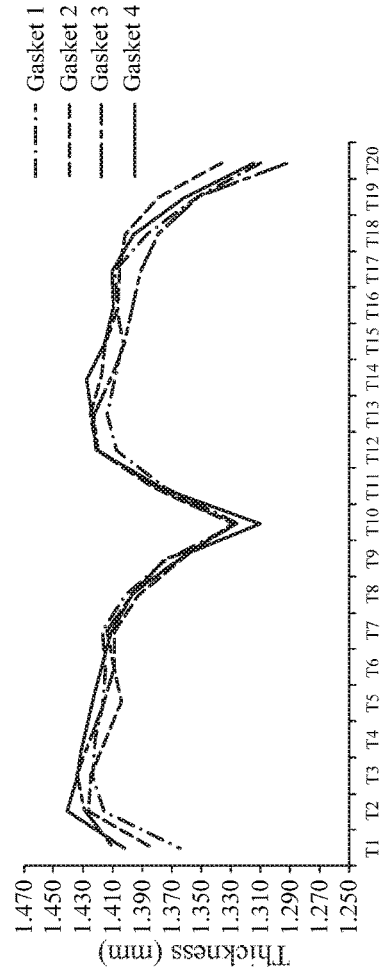
Figure 4A:
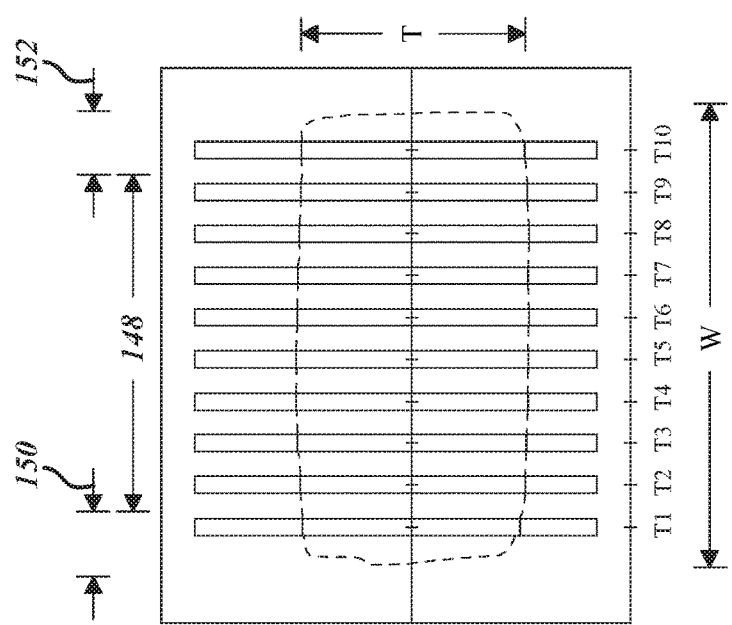

FIG. 4A is an illustration of a micrograph of a partial cross-sectional view of a spark plug gasket, such as the gasket of FIG. 2 taken along the Y-Y axis, where the gasket has been shrunken onto the threaded shell during the gasket attachment process but still maintains good planarity, as demonstrated by its substantially uniform thickness; and FIGS. 4B and 4C are graphs showing the respective thicknesses for several different spark plug gaskets at select points, including the gasket of FIG. 4A, where FIG. 4B shows the gasket before it is shrunk and FIG. 4C shows the gasket after it is shrunk.

DESCRIPTION

According to the gasket attachment method described herein, a flat spark plug gasket is inserted over the threaded portion of a spark plug shell and then an attachment tool having a collet is used to squeeze or shrink the gasket onto the shell so that it cannot slip back over the threaded portion and fall off. Unlike traditional methods that crimp the spark plug gasket onto the shell, the present method maintains the planarity or flatness of the gasket so that no annular ridge or groove is formed during the attachment process. Those skilled in the art will appreciate that spark plug gaskets with planar or flat sealing surfaces can create better seals between the spark plug shell and the engine cylinder head, particularly if the cylinder head is formed by a lost foam casting or other process which can result in a cylinder head sealing surface that is somewhat porous and difficult to seal against. By maintaining a planar or flat gasket sealing surface, even after attachment over the threaded portion of the shell, the spark plug gasket described herein may enable the manufacturer to avoid costly steps like machining or polishing the corresponding sealing surfaces of the cylinder head, as the gasket can create a strong enough seal on its own.

The spark plug gasket and corresponding attachment method set forth in this description can be used with a wide variety of spark plugs and other ignition devices including automotive spark plugs, diesel glow plugs, industrial plugs, aviation igniters, or any other device that is used to ignite an air/fuel mixture in an engine. This includes spark plugs used in automotive internal combustion engines equipped to provide gasoline direct injection (GDI), engines operating under lean burning strategies, engines operating under fuel efficient strategies, engines operating under reduced emission strategies, or a combination of these. As described below in more detail, the present gasket attachment method results in a post-formed spark plug gasket that has a substantially uniform thickness and a substantially planar or flat gasket sealing surface (i.e., it does not have a pronounced annular ridge or groove like many prior art gaskets that are formed through crimping). This maximizes the surface area available for sealing between the spark plug gasket and the cylinder head and enables the plug to successfully seal against otherwise difficult sealing surfaces, like porous surfaces of a cylinder head made from certain casting processes. As used herein, the terms axial, radial, and circumferential describe directions with respect to the generally cylindrical shape of the spark plug of FIG. 1 and refer to a center axis A of the spark plug 10, unless otherwise specified.

Referring to FIG. 1, a spark plug 10 includes a center electrode (CE) base or body 12, an insulator 14, a metallic shell 16, a ground electrode (GE) base or body 18, and a gasket 30. The CE body 12 is generally disposed within an axial bore 20 of the insulator 14, and has an end portion exposed outside of the insulator at a firing end of the spark plug 10. In one example, the CE body 12 is made of a nickel-based alloy material that serves as an external or cladding portion of the body, and includes a copper or copper-based alloy material that serves as an internal core of the body for managing heat within the CE body. Of course, other materials and configurations are possible including a non-copper cored CE body of a single material. The CE body 12 may or may not include a separate firing tip, pad or piece made of a precious metal-based alloy, such as those made of platinum, iridium, ruthenium, palladium, rhodium or a combination thereof.

The insulator 14 is generally disposed within an axial bore 22 of the metallic shell 16, and has an end or nose portion exposed outside of the shell at the firing end of the spark plug 10. The insulator 14 is made of a material, such as a ceramic material, that electrically insulates the CE body 12 from the metallic shell 16. According to the non-limiting example shown in FIG. 1, the insulator 14 includes an exterior shoulder 40 that is supported by an interior shoulder 42 of the metallic shell 16 such that the two components mate with one another and are sealed together with an annular sealing element 44. Of course other insulator material and configurations could be used instead, including ones having multiple exterior shoulders and sealing elements.

The metallic shell 16 provides an outer structure or housing for the spark plug 10 and includes a free end portion 50, a threaded portion 52 for installation in an engine cylinder head, an exterior shoulder 54 for seating against the cylinder head, a hex or installation portion 56 for use with an installation tool, and a closed end portion 58 that is crimped onto the insulator 14. The metallic shell 16 can be composed of a number of types of steel or any other suitable metal, and it may also be coated with a zinc-based or nickel-based alloy coating, for example. The threaded portion 52 extends between the free end portion 50 and the exterior shoulder 54 and, depending on the particular application for which the spark plug is designed, the threaded portion can have male threads with one of a number of common diameters (e.g., M14, M12, M10, M8, etc.). The exterior shoulder 54 radially extends outwards from the threaded portion 52 and includes an annular shell sealing surface 60. When the spark plug 10 is threadingly installed in the cylinder head, the gasket 30 is squeezed or compressed between the shell sealing surface 60 and a corresponding sealing surface of the cylinder head, thereby creating an airtight seal that prevents blow by of exhaust gases. The hex portion 56 is designed to receive a socket, wrench or other installation tool so that the spark plug can be screwed into the cylinder head with an appropriate amount of torque. It should be appreciated that the materials and configurations illustrated in FIG. 1 are simply exemplary and that other designs, including shells with shorter threaded portions (i.e., with shorter reaches) could certainly be used instead.

The GE body 18 is attached to the free end portion 50 of the metallic shell 16 and, as a finished product, may have a standard J-gap or other suitable configuration. At a free end portion 70, a side surface 72 of the GE body may oppose the end portion of the CE body 12 across the spark gap G in an axial direction. Like the CE body 12, the GE body 18 may be made of a nickel-based alloy material that serves as an external or cladding portion of the body, and can include a copper or copper-based alloy material that serves as a thermally conducting internal core; other examples are possible including non-cored bodies made of a single material. Some non-limiting examples of nickel-based alloy materials that may be used with the CE body 12, GE body 18, or both include alloys composed of nickel (Ni) along with chromium (Cr), iron (Fe), aluminum (Al), manganese (Mn), silicon (Si), other elements, or a combination thereof. Even more specific examples of possible alloys include materials commonly known as Inconel 600 or 601. In cross-sectional profile, the GE body 18 can have a generally rectangular shape or some other suitable profile. The GE body 18 may or may not include a separate firing tip, pad or piece made of a precious metal-based alloy, such as those made of platinum, iridium, ruthenium, palladium, rhodium or a combination thereof. Depending on the particular embodiment, neither the CE nor the GE body may include a separate firing piece, both the CE and the GE body may include a separate firing piece, only the CE body includes a separate firing piece, or only the GE body includes a separate firing piece, to cite some of the possibilities.

With reference to FIGS. 1 and 2, the spark plug gasket 30 is now described in more detail. The spark plug gasket 30 is both solid and annular or ring-shaped so that it has an inner diameter $D_I$ and an outer diameter $D_O$, where the inner diameter $D_I$ is smaller than the outer diameter $D_O$. The width W of spark plug gasket 30, as that term is used herein, is defined as the distance between the inner diameter $D_I$ and the outer diameter $D_O$ and it is measured in the radial direction ($(D_O - D_I)/2$, as illustrated in FIG. 2). The height or thickness T of the spark plug gasket 30, as that term is used herein, is defined as the distance between the first and second gasket sealing surfaces 80 and 82 and it is measured in the axial direction (also illustrated in FIG. 2). When the spark plug gasket 30 is properly installed on the spark plug 10, these different dimensions are consistent with the axial, radial and circumferential directions mentioned earlier. One of the potential characteristics of the spark plug gasket 30 is that the ring-shaped configuration of the gasket, with its substantially planar first and second gasket sealing surfaces 80 and 82, is maintained throughout the gasket attachment method so that the post-formed gasket is largely the same in terms of configuration as the pre-formed gasket; there are, however, dimensional changes that occur during attachment, as described below.

The spark plug gasket 30 may be punched, along with a number of other gaskets, from a plate—or sheet-like piece of a metal material. Some non-limiting examples of suitable metal materials that could be used to make the spark plug gasket 30 include copper, nickel, steel, aluminum, brass, or alloys thereof (e.g., ASTM B152). Those skilled in the art will recognize that the spark plug gasket 30 may be made from any number of suitable materials and is not limited to copper alloys, but copper-based materials like oxygen-free coppers such as C10100, phosphorized coppers such as C12000, or any coppers conforming to designation ASTM B152 can be particularly well suited. When the spark plug 10 is installed in the cylinder head and is torqued down via an installation tool, like a torque wrench, the gasket 30 is compressed between the shell sealing surface 60 and a corresponding sealing surface of the cylinder head; thus, the hardness or other mechanical characteristics of the gasket could be relevant to the quality of the seal. According to a non-limiting embodiment, the spark plug gasket 30 may be made from a copper-based alloy with a hardness of 85 Knoop or greater, but other alloys and hardnesses could certainly be used.

Figure 3B:
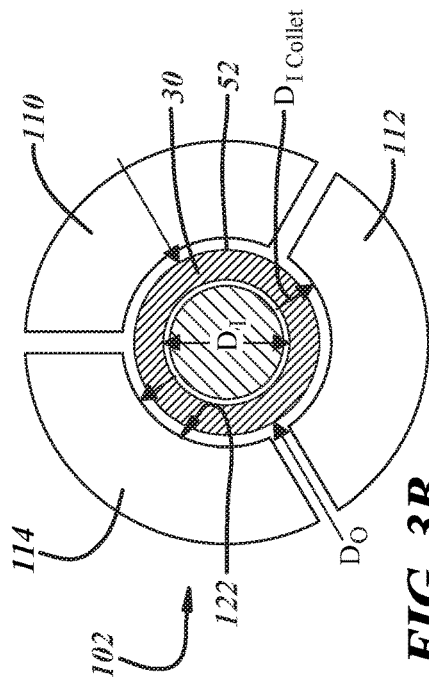
FIGS. 3B and 3C are top down views showing the collet from FIG. 3A attaching the spark plug gasket over a threaded shell, where
Figure 3C:
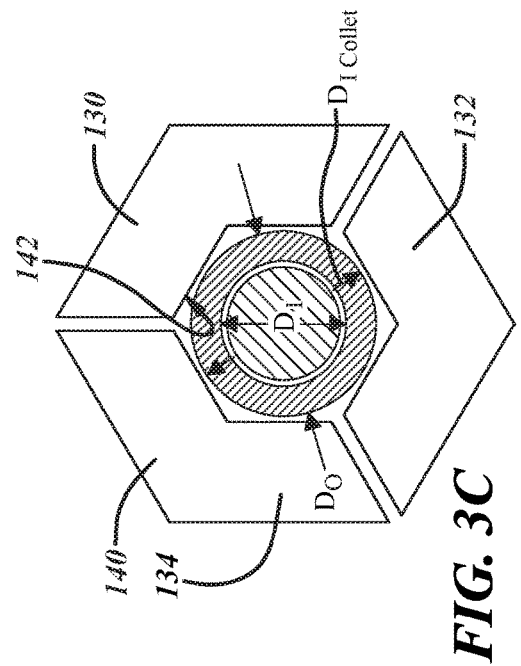
Figure 3A:
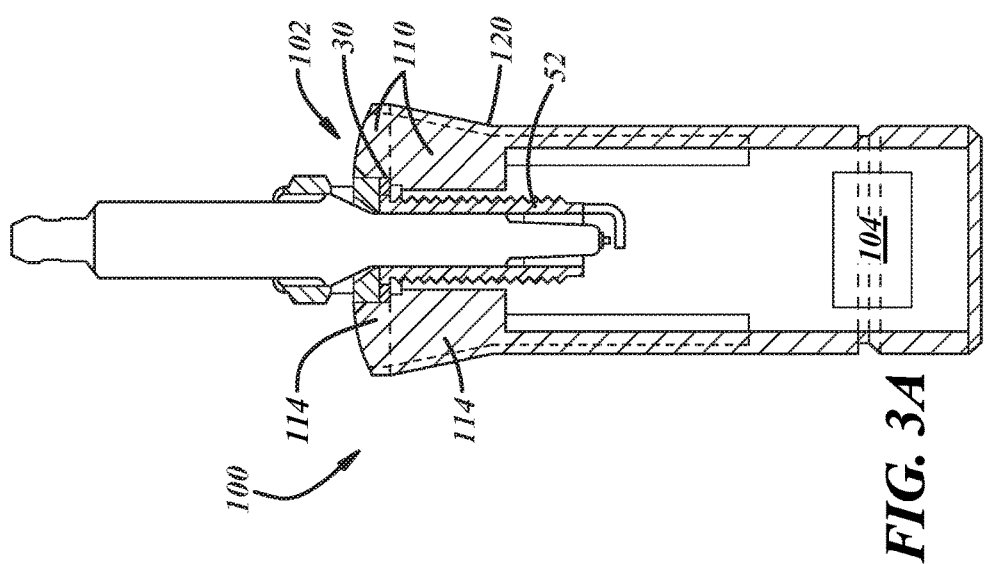
FIG. 3A is a cross-sectional view of the spark plug of FIG. 1 during an exemplary gasket attachment method, where the spark plug is inserted within an attachment tool that uses a collet to shrink and attach the spark plug gasket over a threaded shell.

Referring now to FIGS. 3A-3C, there is provided a description of the present gasket attachment method, where an exemplary attachment tool 100 having a collet 102 and a drive mechanism 104 is used to attach or otherwise install a spark plug gasket 30 over the threaded portion 52 of the shell. In general, a spark plug 10 with a pre-formed spark plug gasket is inserted into the top or open end of the attachment tool 100 so that the gasket 30 and/or the exterior shoulder 54 of the shell rests within the collet 102. It is worth noting that at this stage, the inner diameter $D_I$ of the pre-formed gasket is necessarily larger or greater than the outer diameter of the shell threaded portion 52; this allows the pre-formed gasket to slide over top of the threads and into place next to the exterior shoulder 54. Furthermore, at this stage, the collet 102 is open because the various collet segments 110-114 are still somewhat spaced or separated from one another so that the overall inner diameter of the collet $D_{ICollect}$ is larger or greater than the outer diameter $D_O$ of the spark plug gasket 30. The collet inner diameter $D_{ICollect}$ needs to be larger than the outer diameter $D_O$ of the gasket at this point so that the spark plug with the pre-formed gasket can be inserted into the open collet 102.

Once the spark plug 10 is in place, as illustrated in FIG. 3A, the drive mechanism 104 retracts or otherwise pulls the different collet segments 110-114 down within a tapered sleeve 120 so that the collet closes and the collet segments are drawn together. According to the particular embodiment of FIG. 3B, the collet 102 is a round collet so that when the different segments 110-114 are drawn together by the drive mechanism, they form a round or circular contact surface 122 that becomes a unified or continuous surface and exerts a generally uniform radially inward force against the outer circumferential side of the spark plug gasket 30. Contact surface 122 may consist of three segments of approximately 120° each, as shown in FIG. 3B, or it could include a different number of segments (e.g., two, four, five, six segments, etc.). The spark plug gasket is thereby shrunk and becomes attached to the shell 16, as the inner diameter $D_I$ of the gasket is now smaller than the outer diameter of the threaded portion 52 and, thus, cannot slide down past the threads of the shell. In some embodiment, $D_I$ of the pre-formed gasket is greater than $D_I$ of the post-formed gasket, and $D_O$ of the pre-formed gasket is greater than $D_O$ of the post-formed gasket.

Because of the generally uniform or equal radial forces that are simultaneously exerted by the different collet segments 110-114 against the outer circumferential side of the gasket 30 as the collet segments are drawn into the tapered sleeve 120, the post-formed gasket maintains substantially planar or flat gasket sealing surfaces 80 and 82. When the spark plug gasket 30 is shrunk, excess material is distributed inward to create a thicker gasket, but this generally happens in an even manner so that the gasket is thicker but still flat or planar. This is different than most traditional gasket crimping processes, where the crimping force from the tool distributes gasket material in a way that forms an annular ridge or groove in the sealing surfaces. Put differently, the present gasket attachment method changes the dimensions of the gasket, but not the flat sealing surface configuration. It should be appreciated that any suitable drive mechanism 104, including those utilizing hydraulic, pneumatic and/or electric means, may be used to drive or transition the collet between open and closed positions, and that the interior profile of the attachment tool could have any number of different shapes depending on the application, gasket specifications, materials involved, etc.

FIG. 3C shows a different embodiment of collet 102, where the different collet segments 130-134 make up a hex-type collet. As illustrated in that figure, when the different collet segments 130-134 are drawn together by the drive mechanism, they form a contact surface 142 that, like the previous embodiment, becomes a unified or continuous surface, but it is non-circular. Contact surface 142 is composed of different linear segments (e.g., two, three, four, five, six segments, etc.), where each linear segment tangentially contacts and exerts a radially inward force against the outer circumferential side of the spark plug gasket 30. This collet arrangement exhibits much the same effect as the round collet shown in FIG. 3B, thus, a duplicate description of its operation has been omitted. Of course, other arrangements could be used instead, as the present gasket attachment method is not limited to the specific embodiments illustrated and described herein. For instance, the attachment tool may include any suitable clamping or gripping device that exerts an inwardly radial force against the outer surface of the gasket, and could be used in lieu of the illustrated collets.

FIGS. 4A-4C provide data pertaining to the uniformity of the thickness of the spark plug gasket 30, which in turn can relate to the planarity of the gasket sealing surfaces, before and after the gasket is attached to the shell. More specifically, FIG. 4A is an illustration of a cross section of a post-formed spark plug gasket 30, where ten separate thickness measurements have been taken ($T_1$-$T_{10}$) across the width W of the gasket. In FIG. 4A, the broken line outline represents a cross section of a post-formed gasket (due to the annular shape of the gasket, a cross section taken along the Y-Y axis would include another half or portion located 180° from the one shown in FIG. 1A, but the other sectional portion has been omitted for clarity). FIG. 4B graphs these separate thickness measurements before the spark plug gasket 30 is shrunk over the shell threaded portion 52 (i.e., a pre-formed gasket) and FIG. 4C graphs the different thickness measurements after the gasket is shrunk (i.e., a post-formed gasket), and both FIGS. 4B-C do so for four different test gaskets (this explains the four separate plots per graph). The other readings in FIGS. 4B and 4C (thickness measurements $T_{11}$-$T_{20}$) pertain to the other half or portion of the cross-sectioned gasket and do not include any measurements from the center of the gasket where there is no material. As explained earlier, it is desirable for the post-formed gasket to have generally planar or flat gasket sealing surfaces 80 and 82, as that provides more surface area for creating an airtight seal. One factor that may be used to evaluate the planarity of the gasket sealing surfaces 80 and 82 is to look at the height or thickness T of the gasket across its width W, as planar surfaces that are parallel will maintain a substantially constant or uniform thickness. For purposes of the present application, a "substantially uniform thickness" is determined by using one or both of the following methods.

According to a first method, a spark plug gasket having a "substantially uniform thickness" means a post-formed gasket that has already been attached on a shell 16 and shrunk so that the gasket cannot slip back over and off of the threaded portion 52, where the difference between the smallest and the largest thickness measurements ($\Delta T_{POST}$) across the width of the gasket is no greater than 0.15 mm. This method or technique does not consider the thickness differences before the spark plug gasket was shrunk. Referring to FIGS. 4A and 4C, an explanation of this method is provided, where the broken line in FIG. 4A represents the cross-sectional outline of a post-formed gasket. First, a number of height or thickness measurements ($T_1$-$T_{10}$) are taken across the width W of the gasket (e.g., the ten readings in FIG. 4A, where each reading is taken at a different measurement location and is plotted in FIG. 4C). It is worth mentioning, the ten vertically aligned rectangles shown in FIG. 4A simply pertain to the zones or areas where each measurement was taken (i.e., they are part of the printout from the measurement instrumentation), and are not actual parts of the gasket. Second, only thickness readings within a main sealing area 148 are considered. Skilled artisans will appreciate that a certain amount of rounding or smearing occurs at the edges of the gasket when it is initially punched or stamped from a metal sheet (see edge regions 150 and 152, which are not a perfect) 90°. These rounded edges can significantly affect the thickness measurements in the edge regions, thus, thickness measurements in the edge regions 150 and 152 are not considered in this calculation (the edge region extends inwards for 0.5 mm from each of the edges of the gasket; see arrows in FIG. 4A). According to this example, only thicknesses $T_2$-$T_9$ would be considered, as thicknesses $T_1$ and $T_{10}$ fall within edge regions 150 and 152, respectively. Third, a thickness difference ($\Delta T_{POST}$) is calculated—in the case of gasket 1 in FIG. 4C (dotted line), the difference between $T_4$ (the largest reading within the main sealing area 148, at about 1.42 mm) and $T_9$ (the smallest reading within the main sealing area 148, at about 1.34 mm) equals a $\Delta T_{POST}$ of about 0.08 mm. Because the thickness difference ($\Delta T_{POST}$) of 0.08 mm is not greater than 0.15 mm, gasket 1 in FIG. 4C has a substantially uniform thickness, as defined herein.

According to a second method, a spark plug gasket having a "substantially uniform thickness" means a gasket where $\Delta T_{POST}/\Delta T_{PRE}$ is between 0.5 and 1.5, inclusive, where $\Delta T_{POST}$ is the difference between the largest and smallest thickness measurements for a post-formed gasket that has already been attached on a shell 16 and compressed so that it cannot slip back over the threaded portion 52, as defined in the preceding paragraph, and $\Delta T_{PRE}$ is the same difference in thickness measurements but for the gasket before it is attached to the shell. This technique takes into consideration the fact that oftentimes the planarity of the gasket to begin with, before it is attached, can have an impact on the planarity of the gasket after it is attached. Keeping with the same gasket 1 from the example above, FIG. 4B (pre-formed thickness measurements) shows that the difference between $T_3$ (the largest reading within the main sealing area 148, at about 1.40 mm) and $T_9$ (the smallest reading within the main sealing area 148, at about 1.34 mm) equals a $\Delta T_{PRE}$ of about 0.06 mm. Because $\Delta T_{POST}/\Delta T_{PRE}$ for exemplary gasket 1 equals 0.08/0.06 or 1.33, which is between 0.5 and 1.5, gasket 1 in FIGS. 4B and 4C is considered to have a substantially uniform thickness, as defined herein.

As explained already, gaskets with a substantially uniform thickness typically display greater planarity across their sealing surfaces, which in turn increases the surface area available for sealing and improves the seal. Some initial testing indicates that the present spark plug gasket 30 may be particularly useful with small diameter plugs (e.g., M10 plugs) where only about 8-12 ft lbs of installation torque can be used to install the spark plug within the cylinder head, as additional torque could break the plug. The spark plug gasket 30 and gasket attachment method described herein could be used to offset the loss of sealing performance due to the low installation torque of M10 and smaller plugs.

Further initial testing supports that spark plug gasket 30 has a reduced leakage rate when compared to a standard spark plug gasket. Table 1 lists the leakage rates of a standard gasket used in a lost foam simulation chamber or environment. Testing was carried out at a torque of 25 N·m. Table 2 lists the leakage rates of an exemplary embodiment of gasket 30, as carried out on a suitable test spark plug in a lost foam simulation chamber or environment. Testing was also carried out at a torque of 25 N·m. Post-crimp leak testing was performed using the following method: the spark plug specimen was threaded into the test fixture and fastened with the proper torque; with the pressure release valve closed, the fixture was pressurized with gaseous nitrogen via the supply valve; the pressure was monitored until it stabilized; once the pressure was stable, the supply valve was closed to isolate the test fixture volume from the supply; pressure was recorded as the initial pressure; after 60 seconds, the pressure was recorded again as the final pressure; leak decay was then calculated using the formula $$\frac{(PI \text{ Bar} - PF \text{ Bar}) * 1000 \frac{mBar}{Bar} * L}{\text{seconds}}.$$

After every two samples the test fixture is cleaned and lightly sanded to maintain the seal surface. As seen between Table 1 and Table 2, the average leak rate decreased from 20.41 mbar*l/s to 0.059 mbar*l/s.

TABLE 1

Standard Gasket

| Trial | Initial Pressure (Bar) | Final Pressure (Bar) | Leakage Rate (mbar*l/s) |
|---|---|---|---|
| 1 | 19.32 | 16.84 | 11.55 |
| 2 | 19.31 | 13.38 | 27.67 |
| 3 | 19.31 | 17.55 | 8.17 |
| 4 | 19.31 | 11.02 | 38.67 |
| 5 | 19.32 | 15.89 | 15.99 |
| Average | — | — | 20.41 |

TABLE 2

Exemplary Gasket

| Trial | Initial Pressure (Bar) | Final Pressure (Bar) | Leakage Rate (mbar*l/s) |
|---|---|---|---|
| 1 | 19.44 | 19.432 | 0.039 |
| 2 | 19.506 | 19.5 | 0.030 |
| 3 | 19.51 | 19.498 | 0.059 |
| 4 | 19.256 | 19.24 | 0.079 |
| 5 | 19.444 | 19.431 | 0.064 |
| 6 | 19.399 | 19.386 | 0.064 |
| 7 | 19.356 | 19.344 | 0.059 |
| 8 | 19.338 | 19.325 | 0.064 |
| 9 | 19.252 | 19.246 | 0.030 |
| 10 | 19.348 | 19.342 | 0.030 |
| 11 | 19.277 | 19.267 | 0.049 |
| 12 | 19.344 | 19.341 | 0.015 |
| 13 | 19.346 | 19.326 | 0.098 |
| 14 | 19.287 | 19.265 | 0.108 |
| 15 | 19.352 | 19.331 | 0.103 |
| 16 | 19.297 | 19.285 | 0.059 |
| Average | — | — | 0.059 |

It is to be understood that the foregoing is a description of one or more preferred exemplary embodiments. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of attaching a gasket to a metallic shell of a spark plug, the method comprising the steps of:
    inserting a pre-formed gasket overtop of a threaded portion of the metallic shell, wherein the pre-formed gasket has a pre-formed inner diameter that is greater than an outer diameter of the threaded portion;
    inserting the metallic shell with the pre-formed gasket thereon into an attachment tool;
    driving the attachment tool from an open position to a closed position such that the attachment tool exerts a radially inward force against the pre-formed gasket; and
    transforming the pre-formed gasket into a post-formed gasket that has a post-formed inner diameter that is less than the outer diameter of the threaded portion, wherein the post-formed gasket is flat and has a substantially uniform thickness.

2. The method of claim 1, wherein the first inserting step further comprises inserting the pre-formed gasket overtop of the threaded portion of the metallic shell so that the pre-formed gasket is located between the threaded portion of the metallic shell and an exterior shoulder of the metallic shell.

3. The method of claim 1, wherein the second inserting step further comprises inserting the metallic shell with the pre-formed gasket thereon into the attachment tool which includes a collet with a plurality of collet segments, during the second inserting step the collet is open so that the plurality of collet segments are somewhat spaced from one another and so that an overall inner diameter of the collet ($D_{ICollet}$) is greater than a pre-formed outer diameter of the gasket.

4. The method of claim 3, wherein the driving step further comprises driving the attachment tool by forcing the plurality of collet segments into a tapered sleeve so that the plurality of collet segments are drawn together and exert a radially inward force against an outer circumferential side of the pre-formed gasket.

5. The method of claim 3, wherein the collet is a round collet and when the plurality of collet segments are drawn together, they form a unified circular contact surface that exerts a generally uniform radially inward force against the outer circumferential side of the pre-formed gasket.

6. The method of claim 5, wherein the plurality of collet segments consists of three collet segments, each of which is approximately 120°.

7. The method of claim 3, wherein the collet is a hex-type collet and when the plurality of collet segments are drawn together, they form a unified non-circular contact surface that exerts a radially inward force against the outer circumferential side of the pre-formed gasket.

8. The method of claim 7, wherein each of the plurality of collet segments has a linear segment that tangentially contacts the outer circumferential side of the pre-formed gasket.

9. The method of claim 1, wherein the transforming step further comprises transforming the pre-formed gasket into the post-formed gasket without forming an annular ridge or groove in a gasket sealing surface.

10. The method of claim 1, wherein the transforming step further comprises transforming the pre-formed gasket into the post-formed gasket by changing one or more dimensions of the pre-formed gasket while still maintaining a planar gasket sealing surface.

11. The method of claim 1, wherein the transforming step creates the post-formed gasket with a substantially uniform thickness (T) and a $\Delta T_{POST}$ across a width of the gasket that is no greater than 0.15 mm, where $\Delta T_{POST}$ is a difference between a largest and a smallest thickness measurement in a main sealing area for the post-formed gasket.

12. The method of claim 1, wherein the transforming step creates the post-formed gasket with a substantially uniform thickness (T) and a ratio of $\Delta T_{POST}/\Delta T_{PRE}$ that is between 0.5 and 1.5, inclusive, where $\Delta T_{POST}$ is a difference between a largest and a smallest thickness measurement in a main sealing area for the post-formed gasket and $\Delta T_{PRE}$ is a difference between a largest and a smallest thickness measurement in a main sealing area for a pre-formed gasket.

* * * * *